United States Patent [19]
Larson

[11] 3,956,448
[45] May 11, 1976

[54] METHOD OF CENTRIFUGALLY CASTING A TIRE

[75] Inventor: William M. Larson, Hudson, Ohio

[73] Assignee: The Goodyear Tire & Rubber Company, Akron, Ohio

[22] Filed: Oct. 21, 1974

[21] Appl. No.: 516,511

[52] U.S. Cl.............................. 264/138; 156/125; 264/163; 264/277; 264/278; 264/310; 264/311; 264/328; 264/334
[51] Int. Cl.²...................... B29C 5/04; B29H 9/02; B29H 17/00
[58] Field of Search ........... 264/310, 311, 326, 328, 264/277, 278, 334, 138, 163, 336; 156/125

[56] References Cited
UNITED STATES PATENTS

| | | | |
|---|---|---|---|
| 2,650,633 | 9/1953 | Eger | 264/326 |
| 3,200,180 | 8/1965 | Russ et al. | 264/311 |
| 3,229,013 | 1/1966 | Newton et al. | 264/326 |
| 3,276,930 | 10/1966 | Keefe | 264/326 |
| 3,506,752 | 4/1970 | Varnell et al. | 264/311 |
| 3,555,142 | 1/1971 | Haener | 264/311 |

*Primary Examiner*—Willard E. Hoag
*Attorney, Agent, or Firm*—F. W. Brunner; H. E. Hummer

[57] ABSTRACT

A method of forming a low pressure, flotation type tire by centrifugally casting polyurethane around a network of conventional tire cords which are held concentrically about an axis to form a cylindrically shaped tire which is then mounted on a rim and inflated into the toroidal configuration of more conventionally built tires.

9 Claims, 6 Drawing Figures

U.S. Patent   May 11, 1976   3,956,448
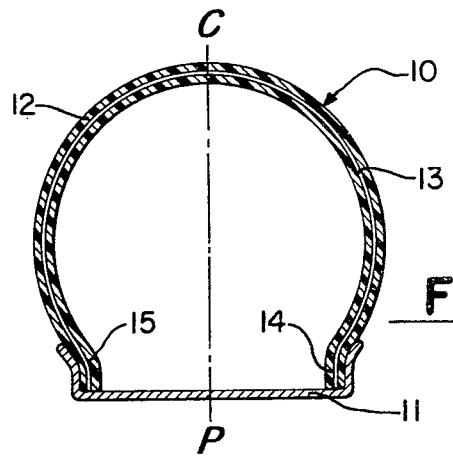
FIG. 1
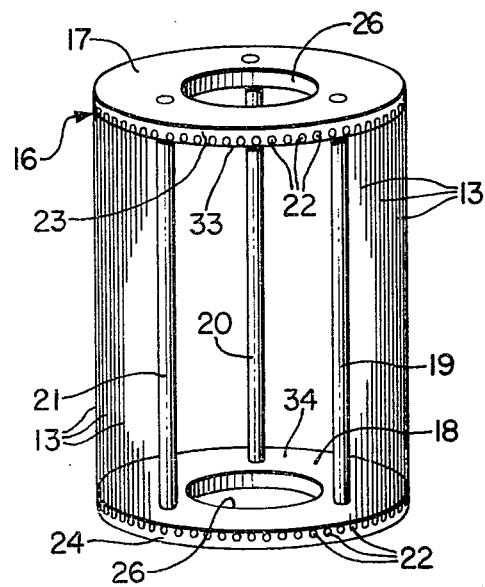
FIG. 3
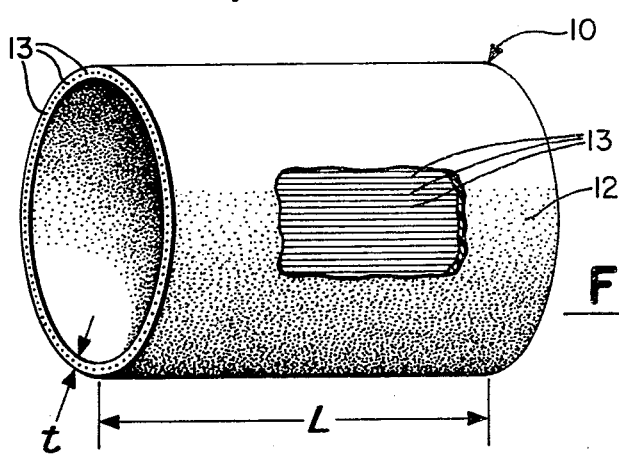
FIG. 2
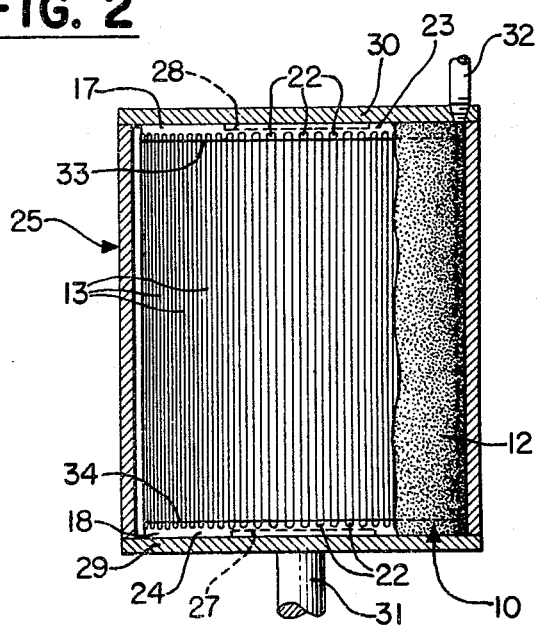
FIG. 4
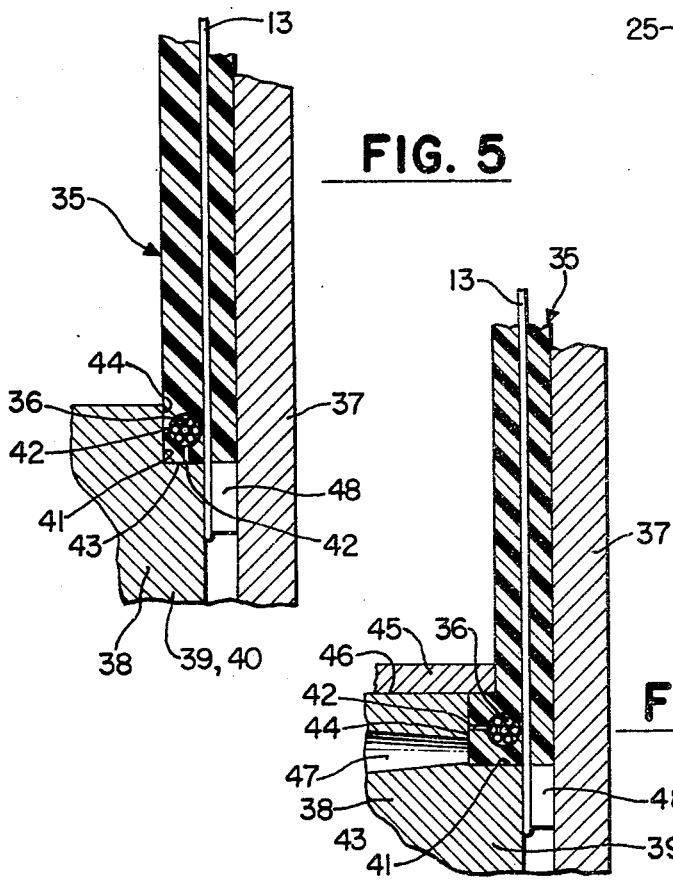
FIG. 5
FIG. 6

METHOD OF CENTRIFUGALLY CASTING A TIRE

BACKGROUND OF THE INVENTION

The invention is particularly well suited for building low pressure, flotation type tires which are generally used on amphibious type vehicles. Moreover, the invention is designed for use in the casting, or injection molding of tires, and especially centrifugally casting polyurethane rubbery material around a network of conventional tire reinforcement cords.

Most pneumatic tires are cast, or injection molded in a toroidal configuration, as shown in U.S. Pat. No. 3,458,373. This particular patent shows and describes injecting tire forming material around a preformed, basket-like reinforcement structure braided from organic, or inorganic wire, or from thermoplastic synthetic resins, as distinguished from individual tire cords normally used in the reinforcement of tires built by more conventional methods using plies of rubbery material reinforced with such cords. It can be easily imagined that it is extremely difficult maintaining the individual tire reinforcement cords in toroidal pathways during the casting, or injection molding process, since the cords are easily pushed from their desired pathways by the material as it flows into the mold. Moreover, the cords contact the inner core of the mold, if spacers are not used for maintaining the cords free of the core. This is evidenced by the aforementioned patent which shows and describes the use of a number of spacers for holding the basket-like structure free of the inner core of the mold. The invention is directed to solving this particular problem.

Briefly stated, the invention is in an improved method of casting, or injection molding a tire. Similarly dimensioned lengths of conventional tire cords are held cylindrically in parallel array while a suitable tire forming material is cast, or injection molded around the cords to form a cylindrically shaped tire which is then cured in the cylindrical configuration.

DESCRIPTION OF THE DRAWING

The following description of the invention will be better understood by having reference to the annexed drawing, wherein:

FIG. 1 is a section of a rim and flotation tire made in accordance with the invention;

FIG. 2 is a perspective view of the cylindrically shaped tire, prior to mounting on the rim;

FIG. 3 is a perspective view of the mandrel used in holding the tire cords cylindrically in parallel array;

FIG. 4 is a section of a mold and mandrel used in the centrifugal casting of a beadless tire;

FIG. 5 is a section of a mold and mandrel used in the centrifugal casting of a tire with conventional tire beads; and FIG. 6 is a section of a mold and mandrel used in the centrifugal casting of a tire in which the bead areas are shaped differently from those illustrated in FIG. 5.

DESCRIPTION OF THE INVENTION

Referring particularly to FIGS. 1 and 2, there is shown a flotation-type tire 10 which is mounted on a wheel rim 11 and maintained under low fluid pressure, e.g. 4–10 pounds of air per square inch (psi). The flotation tire 10 is symmetrical about a plane CP, hereinafter referred to as the centerplane since this plane normally contains the mid-circumferential centerline of the tire thread which, in this instance, is not readily distinguished by a pattern of ribs and grooves normally formed in a tread. The tire 10 has an integrally formed body 12, including a number of conventional tire cords 13 extending between what are normally considered to be the bead areas 14 and 15 of the tire 10. In this instance, however, conventional wire beads are not utilized in the bead areas 14 and 15.

The tire cords 13 are composed of any suitable material, e.g. cotton, rayon, nylon, polyester, aramid, or steel. Moreover, the cords 13 can be monofilaments, or composed of multifilaments depending on the type of cord desired. The tire body 12 is made of any material appropriate for the casting or injection moldinf of a tire 10. For example, the material should have good flow and wear characteristics, i.e. resistance to abrasion and weather. Polyurethane rubbery material worked especially well in centrifugally casting the tire 10, as will hereinafter be described. Other materials for centrifugally casting the tire 10 are polysulfides, silicones, and butyl rubbers. The tire cords 13 are preferably radially oriented, that is, disposed at angles of about 90° measured in relation to the centerplane of the tire 10.

The tire 10 is cast, or injection molded and cured in a cylindrical shape, as best seen in FIG. 2. The tire 10 of FIGS. 1–4 is beadless and does not employ conventional tire beads. However, this is not extremely critical in building flotation-type tires which are inflated under much lower air pressures and, therefore, not subject to very severe fluid pressure which can unseat the tire 10 from the wheel rim 11 on which the tire 10 is mounted. Actually, the tire 10, shown in FIGS. 1–4, has a cylindrical shape and a uniform thickness $t$ throughout its length L. The following description of building the tire 10 will be in relation to centrifugally casting the tire 10, although it can be appreciated that the broad principles employed in this method are also applicable to the regular casting, or injection molding of a similarly shaped tire.

The tire cords 13 are strung on a former, or mandrel 16 for maintaining the cords in parallel array and in a cylindrical configuration during the centrifugal casting process. The tire cords 13 are oriented approximately parallel to the longitudinal axis of the mandrel 16. The mandrel 16 comprises a pair of annular plates 17 and 18 which are held in parallel relation by a plurality of spacer rods 19, 20, and 21. The plates 17 and 18 each have a series of identical projections 22 extending from their outer peripheries 23 and 24.

The projections 22 are equally spaced around the outer peripheries 23 and 24 of the plates 17 and 18 and have a width, measured in a circumferential direction, which is equal to the spacing between the projections 22, such that the spacing between adjacent parallel cords 13 is identical. The mandrel 16 with the parallel cords 13 strung in parallel array between the opposing plates 17 and 18, is placed in a cylindrical mold 25.

The plates 17 and 18 each have a centrally disposed opening 26 for receiving similarly sized and shaped protuberances 27 and 28 projecting centrally from the bottom and top cover plates 29 and 30 of the mold 25. In this way, the mandrel 16 is centered within, or brought into registry with the mold 25. The bottom 29 of the mold 25 is secured to a drive shaft 31 which is coupled to any conventional mechanism for rotating, or spinning the mold 25 during the casting process. Liquid polyurethane rubbery material is poured into the mold 25 through a conventionally designed sprue 32 in the cover plate 30 of the mold 25. The tire 10 is cast such that the reinforcement cords 13 are very nearly centrally embedded within the cured tire body 12. The polyurethane rubbery materail is given time to set-up and cure, after which the mandrel 16 and cylindrically shaped cast tire 10 is taken from the mold 25. The cylindrical tire 10 is removed from the mandrel 16 by cutting the tire 10 along the opposite inner faces 33 and 34 of the opposing plates 17 and 18 of the mandrel 16. It can be appreciated that the cylindrical tire 10 will be beadless and have a uniform wall thickness $t$. These beadless tires are more readily adapted to clincher-type rims which grab and hold the beadless areas 14 and 15 of the tire. These tires can, however, be mounted on conventional wheel rims with upstanding flanges, because of the low inflation pressures generally maintained in flotation-type tires.

Referring to FIGS. 5 and 6, there is shown a flotation tire 35 employing conventional tire beads 36. The mold 37 and mandrel 38 are similar in design to those used in casting beadless tires, except the annular plates 39 and 40 of the mandrel 38 are each provided with an annular recess 41 for receiving the tire beads 36. Any suitable means, such as projections 42, are utilized to maintain the beads 36 spaced from adjacent sidewalls 43 and 44 of the annular recesses 41, to allow the flow of casting fluid around the beads 36. The projections 42 also hold the beads 36 in contact with the parallel reinforcement cords 13.

The embodiment of the tire 35, shown in FIG. 5, also has a uniform thickness throughout its length L, whereas the embodiment of the tire 35, shown in FIG. 6, has a greater thickness and differently contoured bead area. The embodiment of the tire 35, shown in FIG. 6, requires a special segmented plate 45 for attachment to the inner faces 46 of the opposing plates 39 and 40 of the mandrel 38 to maintain casting fluid within the annular recess 41. A conventionally designed sprue 47 is provided for filling the sealed off recesses 41 containing the beads 36. The reinforcement cords 13 are partially reeved around similar projections 48 and extend beyond the bead areas and must be trimmed, such that the cords 13 are flush with outer peripheral surfaces of the tire 35. The tire 35 may be cast with some type of interlocking mechanism in the area of the tread for receiving a replaceable tread which is prevulcanized and cemented to the tire body by any suitable adhesive.

Thus, there has been described a method of casting, or injection molding a tire in a cylindrical configuration, whereby conventional tire cords can be utilized to reinforce the tire body. Moreover, the tire cords can be placed under any desirable tension which is practically impossible when molding a tire in the more conventional toroidal configuration.

A material found especially suitable for use in the aforementioned centrifugally casting process is a prepolymer of a polytetramethylene ether polycol of 2000 to 4000 molecular weight with toluene diisocyanate, or other polyisocyanates. Polypropylene ether polyols of diol or triol type, or polyester polyols such as polyethylene/propylene adipate or sebacate, can be used in place of polytetramethylene ether glycol. The prepolymer is then crosslinked or cured by reacting with a glycol or polyamine such as butylene glycol or methylene dichloroaniline or methylene dianiline.

Any appropriate thermoplastic, or polyurethane gum stock, can be used in the injection molding process. A number of thermoplastic polyurethane stocks are available commercially, such as the partially cured, to cured reaction product of an organic polyisocyanate and a polyester polyol of the diol or triol type in combination with a glycol to give a millable gum stock that can be further cured during injection by the presence of a slight excess of isocyanate.

What is claimed is:

1. A method of casting a tire, comprising the steps of:
   a. securing a single, cylindrical layer of tire reinforcement cords to a mandrel between opposing, parallel, circular plates of the mandrel, the cords of the layer being held parallel to the longitudinal axis of the mandrel and fastened to the plates in equally spaced relation around the outer periphery of the plates;
   b. placing the mandrel, with the layer of parallel cords, within a mold having a rigid, cylindrical inner surface such that the tire cords are spaced from the surface;
   c. while holding said cords parallel, causing tire forming material to flow into the mold in contact with the inner surface thereof and around the tire cords while rotating the mold to form a cylindrically shaped uncured tire; and
   d. curing the tire forming material to form a cylindrically shaped tire within the mold.

2. The method of claim 1, which includes rotating the mold about an axis coinciding with the longitudinal axis of the cylindrical tire being formed, as tire forming material flows into the mold.

3. The method of claim 1, which includes removing the cylindrically shaped, cured tire from the mandrel by cutting the tire along the spaced, opposing inner faces of the plates.

4. The method of claim 2, which includes positioning a pair of parallel annular tire beads in contact with the cords adjacent the plates and causing the tire forming materail to flow around the beads, whereby the beads are embedded in the tire upon curing of the material.

5. The method of claim 4, wherein the tire beads are positioned outside the cord and surround them.

6. The method of claim 4, wherein the tire forming materail is polyurethane rubbery material.

7. The method of claim 6, wherein the tire cords are composed of material selected from the group of cotton, rayon, nylon, polyester, aramid, and metal.

8. The method of claim 4, wherein the tire beads are positioned inside the cords and are surrounded by the cords.

9. The method of claim 8, wherein the tire forming material is selected from the group of rubbery materials of polyurethane, polysulfides, silicones, and butyl.

* * * * *